United States Patent

[11] 3,558,826

[72] Inventor Heinz Schluter Kornwestheim, Germany
[21] Appl. No. 676,119
[22] Filed Oct. 18, 1967
[45] Patented Jan. 26, 1971
[73] Assignee International Standard Electric Corporation New York, N.Y. a corporation of Delaware
[32] Priority Nov. 2, 1966
[33] Germany
[31] ST 26,061

[54] GUIDE WIRE CONTROL CIRCUIT ARRANGEMENT FOR A MULTI-STAGE CROSSPOINT NETWORK
3 Claims, 1 Drawing Fig.

[52] U.S. Cl. .................................................... 179/18
[51] Int. Cl. .................................................... H04q 3/42
[50] Field of Search ............................................ 179/18.7Y

[56] References Cited

UNITED STATES PATENTS 3,347,994 10/1967 Schluter ...................... 179/18(.74)

*Primary Examiner*—Kathleen H. Claffy
*Assistant Examiner*—William A. Helvestine
*Attorneys*—C. Cornell Remsen,Jr., Rayson P. Morris, Percy P. Lantzy, J. Warren Whitesel, Phillip A. Weiss and Delbert P. Warner

ABSTRACT: A switching network is provided for establishing a connecting path through a plurality of cascaded switching stages. The crosspoint relays which are to be energized are series-connected in a starting circuit via holding wires and setting wires as well as via contacts of switching multiple marking relays. Only one relay is required per switching multiple, and that relay has a contact at each input row and output column of the switching multiple.

PATENTED JAN 26 1971 3,558,826
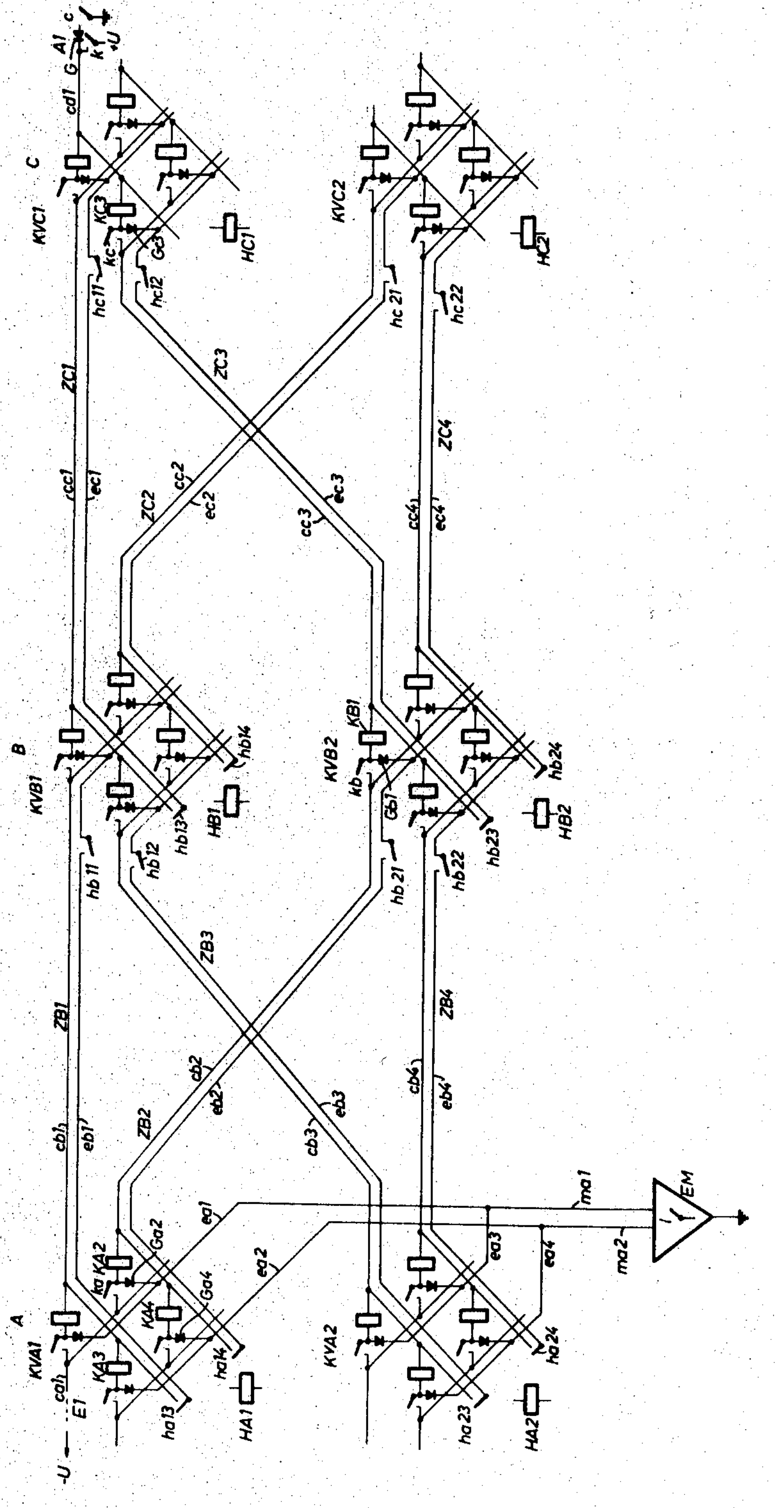

GUIDE WIRE CONTROL CIRCUIT ARRANGEMENT FOR A MULTI-STAGE CROSSPOINT NETWORK

The invention relates generally to circuit arrangements for multistage crosspoint arrangements, formed of a cascaded series of matrix relay switching multiples. More particularly, it relates to means for establishing a connection through use of a route-searching device in each switching stage.

The route-searching device selects a switching multiple and causes a switching multiple marking relay to respond in the associated switching multiple. While these devices find many uses, they are particularly useful in telephone exchange systems. In a regular point arrangement, there always is one single link between two switching multiples of adjacent switching stages. Therefore, a connecting path is definitely indicated by the selection of one switching multiple in each switching stage. However, it is still necessary to operate the crosspoint relays in order to through-connect the path.

A method known to the prior art provides a coordinate-marking of the crosspoint relays. The relays are connected to marking wires individually associated with the columns and rows, respectively. These wires are common, and they serve all switching multiples of a stage. This method of route selection involves a relatively high cost. In order to reduce this cost, it is known to mark the crosspoint relays via the seizing wire of a link arriving from the adjacent switching stage. Thus, if one column of a switching multiple is marked, it is only necessary to mark the row wires in order to selectively actuate a crosspoint relay. In these known arrangements, the seizing wire is marked via a make-contact of an already energized crosspoint relay. However, the disadvantage of these circuit arrangements is that the through-connection can only be made in steps from stage to stage.

In order to obtain a simultaneous through-connection in all switching stages, a series-starting circuit is formed of all crosspoint relays participating in the establishment of a connection. For each of the crosspoint relays to be energized, its make-contact is short-circuited via a switching means that is excited when selecting the respective link. Suitable potentials are applied at the input and at the output ends of the series-connected seizing wires. Preferably, these markings are applied via the windings of the relays to be energized and via the switching means marking the links to be used. All crosspoint relays operate in series. In this type of arrangement, another switching means is required in addition to the marking means for each link. The task of the additional switching means is to prevent the short-circuit, at a seized link, of one of the crosspoint relay make-contacts which is used for providing access to the link. Seized links are thus prevented from exercising any influence upon the following marking processes. However, this expenditure is economical only if the last mentioned switching means simultaneously serve as busy marking during the route search, particularly, if such a busy marking is not required. If the busy marking is performed with the aid of gate circuits in a route-searching network, this circuit arrangement becomes vary expensive.

The object of the present invention is to avoid the aforementioned disadvantages of the circuit arrangements known to the art.

According to the invention, the problem is solved by associating the winding of each crosspoint relay in a series connection with a make-contact belonging to the relay. The series connection is in between the holding wires of the links crossing at this particular crosspoint. A rectifier for each crosspoint is connected at the connecting point between the winding and the make-contact. The free terminals of the rectifiers of each switching multiple are combined for the input rows and connected to a switching wire of the link. The switching wire extends the marking to the respective input row via a make-contact of the switching multiple marking relay associated with the switching multiple. Another make-contact of said switching multiple marking relay is provided between the holding wire and the setting wire of each link and connected to an output column of the switching multiple.

According to the invention, only one relay is required per switching multiple, and that relay has a contact at each input row and output column of the switching multiple. The additional cost due to the setting wire is small, because this wire does not influence the number of through-connecting points per crosspoint element.

A further embodiment of the invention provides that a starting circuit is formed via the windings of the crosspoint relay of a connecting path. One pole of a twin voltage-source is connectable to the holding wire of an output of the crosspoint arrangement. The center tapping (ground) of the twin voltage-source is connectable to the setting wire of an input of the crosspoint arrangement. In order to form a holding circuit across the energized crosspoint relays, the holding wire of the output is connectable to the center tapping, and the holding wire of the input is connectable to the other pole of the twin voltage-source.

The resulting shifting of the potentials on the holding wires of the links, compared to the starting circuit in the holding circuit, prevents an influence on seized connecting elements at succeeding connections. These potentials are blocked by the rectifiers individually associated with the crosspoints.

The above mentioned and other features of this invention and the manner of obtaining them will become more apparent, and the invention itself will be best understood by reference to the following description of an embodiment of the invention taken in conjunction with the accompanying drawing in which the drawing shows a matrix of glass reed switches constructed according to the teachings of the invention.

In greater detail, the drawing shows a part of a crosspoint arrangement. There are two horizontal switching multiples intersecting each of three vertical switching multiples. The horizontal switching multiples KVA1 and KVA2 are parts of a vertical multiple of the stage A. Switching multiples KVB1 and KVB2 are similar parts of a vertical multiple of stage B, and switching multiples KVC1 and KVC2 are corresponding parts of stage C. A switching multiple marking relay (HA1 to HC2) is associated with each switching multiple. This relay is actuated after the associated switching multiple is selected during the route search. For example, assuming that the selected switching multiples are KVC1, KVB2 and KVA1, the relays HC1, HB2 and HA1 are energized. Only the holding wires *ca*1 to *cb*4, *cc*1 to *cc*4 and the setting wire *eb*1 to *eb*4, *ec*1 to *ec*4 are shown of the links ZB1 to ZB4 and ZC1 to ZC4 which extend between the switching multiples. These holding and setting wires are sometimes called "guidewires".

At each crosspoint, the winding of the crosspoint relay, associated with the crosspoint, is series-connected with a make-contact of the relay. This series connection extends between the holding wires of the links crossing at the crosspoint. For example, the winding of the crosspoint relay KB1 is connected in series via its contact *kb* to complete a circuit between the holding wires *cb*2 and *cc*3 of the links ZB2 and ZC3. A rectifier G*b*1 is connected at the common point between contact *kb* and relay winding KB1. A similar rectifier is individually provided for each of said crosspoints. The free end of rectifier G*b*1 is connected to a multiple common to the free ends of all corresponding rectifiers of the same input row of the switching multiple KVB2 and further connected via a make-contact *hb*21 of the switching multiple marking relay HB2 to the setting wire *eb*2 of the link ZB2. The wire *eb*2 is connected to the input row of the switching multiple KVB2.

In analogy, each of the other crosspoints of the crosspoint arrangement is connected to the setting wires of the inputs. These wires are connected to the input rows and are led—in multiple with the setting wires of equal-ringing inputs of other switching multiples—to an end-marker via marking wire. The end-marker can selectively connect one of these marking wires to ground. For example, the setting wires *ea*1 and *ea*3 associated with the first rows of the switching multiple are connected in common to the marking wire *ma*1. These marking wires are grounded by the final marker EM in order to mark the input E1 of the switching multiple KVA1. Of the links connected to the output rows of the switching multiples, the holding wires are connectable with the setting wire via a make-contact of the switching multiple marking relay. For example, the contact *hb*23 of the switching multiple marking relay HB2 serves to connect the setting wire *ec*3 of the link ZC3 with the holding wire *cc*3 of the same link. No setting wires are provided for the outputs of the last switching stage.

Assuming that the multiple marking relays HA1, HB2 and HC1 are energized as a result of the route search in process and assuming further that the end marker EM has applied ground potential to the wire *ma*1 and that contact *k* is closed at output A, the following circuit is obtained: ground, end-marker EM, wires *ma*1, *ea*1, diode G*a*2, crosspoint winding KA2, wire *cb*2, multiple marking contacts *ha*14, wire *eb*2, multiple marking contacts *hb*21, diode G*b*1, crosspoint winding KB1, wire *cc*3, multiple marking contacts *h*23, wire *ec*3, multiple marking *hc*12, diode G*c*3, crosspoint winding KC3, wire *cd*1, and contacts *k* to battery +U. In this circuit the crosspoint relays KA2, KB1, and KC3 operate in series and close their make-contacts *ka*, *kb* and *kc*.

Responsive to the establishment of this circuit, contact *c* closes at the output A1. The markings are removed and the contact *k* is opened. The relays HC1, HB2, and HA1 drop, and ground potential is removed from the wire *ma*1. The crosspoint relays KA2, KB1, and KC3 are held energized in the following circuit: battery −U, wire *ca*1, contacts *ka*, crosspoint winding KA2, wire *cb*2, contacts *kb*, crosspoint winding KB1, wire *cc*3, contacts *kc*, crosspoint winding KC3, wire *cd*1, diode G, and contact *c* to ground. Thus, potentials prevail on the holding wires *cb*2, *cc*3, and *cd*1 which safely block the rectifiers G*a*2, G*b*1, and G*c*3 during later route searches which may be conducted to establish other connecting paths. Thus, the previously through-connected path is marked busy so that it cannot be influenced during later searches, and no erroneous double connection can occur. For example, suppose that the marking wire *ma*2 is grounded in order to establish a connecting path via the switching multiple KVA2 or via the crosspoint KA3 of the switching multiple KVA1. The rectifier G*a*4, located between the marking wire *ma*2 or the switching wire *ca*2 respectively and the seized holding wire *cb*2, is blocked. An erroneous operation of the busy crosspoint relay KA4 is thus impossible.

To release the connection, one or both holding potentials must be switched off.

The number and size of the switching stages and switching multiples is indicated only to explain the invention. However, the invention can be applied to arbitrarily dimensioned crosspoint arrangements. The polarities of the potentials are also given by way of example only. At a corresponding reversal of polarity of the rectifiers, the potentials +U and −U can be interchanged. The center tapping of the twin voltage-source need not necessarily be grounded. For the polarity of the rectifiers as shown, it is only necessary for the potential +U to be positive and −U to be negative towards the center tapping.

While the principles of the invention have been described above in connection with specific apparatus and applications, it is to be understood that this description is made only be way of example and not as a limitation on the scope of the invention.

I claim:

1. A guidewire control circuit arrangement for a multistage crosspoint arrangement, formed of cascaded matrices of relay-switching multiples, for establishing a connecting path responsive to a route search via said guidewires, and for selecting a switching multiple in each switching state comprising switching multiple marking relays associated with said switching multiples, a plurality of guidewires comprising holding and select wires associated with said multiples, crosspoint devices comprising a winding of an associated crosspoint relay series-connected with a make-contact belonging to said relay, said series connection being connected between the holding wires of the links crossing at the crosspoint where the series circuit is located, means including a diode at each crosspoint connected to the junction point between winding and make-contact, the free terminals of the rectifiers of each switching multiple being combined for the input rows, said free terminals are connected to a setting wire of the link and are further connected to the respective input row via a make-contact of the switching multiple marking relay associated with said switching multiple, and that another make-contact of said switching multiple marking relay is provided between the holding wire and setting wire of each link connected to an output column of the switching multiple.

2. The circuit arrangement of claim 1 and starting circuit means comprising said windings of said crosspoint relay of a connecting path, a twin pole voltage-source, one pole of said voltage-source being connectable to the holding wire of an output of said crosspoint arrangement and a center tapping between said twin pole voltage-source connectable to said setting wire at an input of the crosspoint arrangement, and a holding circuit means connected across the energized crosspoint relays which connects said holding wire of said output to said center tapping and connects said holding wire of said input to the other pole of said twin pole voltage-source.

3. The circuit arrangement according to claim 2, characterized in this that each of the setting wires of the inputs of the first switching stage is connectable to the center tapping of the twin voltage-source via a marker.